United States Patent
Willis, II

(10) Patent No.: US 8,677,341 B2
(45) Date of Patent: *Mar. 18, 2014

(54) SOFTWARE-DELIVERED DYNAMIC PERSISTENT DATA

(75) Inventor: Edward Snow Willis, II, Ottawa (CA)

(73) Assignee: BlackBerry Limited, Waterloo (CA)

( * ) Notice: Subject to any disclaimer, the term of this patent is extended or adjusted under 35 U.S.C. 154(b) by 1683 days.

This patent is subject to a terminal disclaimer.

(21) Appl. No.: 11/735,019

(22) Filed: Apr. 13, 2007

(65) Prior Publication Data

US 2007/0245337 A1    Oct. 18, 2007

Related U.S. Application Data

(63) Continuation of application No. 10/765,512, filed on Jan. 27, 2004, now Pat. No. 7,222,340.

(51) Int. Cl.
G06F 9/44 (2006.01)
G06F 7/00 (2006.01)

(52) U.S. Cl.
USPC ........... 717/170; 717/168; 707/674; 707/678; 707/684

(58) Field of Classification Search
USPC ................... 717/168–178; 707/674, 678, 684
See application file for complete search history.

(56) References Cited

U.S. PATENT DOCUMENTS

| | | | |
|---|---|---|---|
| 6,347,398 B1 | 2/2002 | Parthasarathy et al. | |
| 6,721,767 B2 * | 4/2004 | De Meno et al. | 707/684 |
| 6,993,760 B2 * | 1/2006 | Peev et al. | 717/174 |
| 2002/0078142 A1 | 6/2002 | Moore et al. | |
| 2003/0121033 A1 * | 6/2003 | Peev et al. | 717/175 |
| 2003/0221189 A1 | 11/2003 | Birum et al. | |
| 2004/0216133 A1 | 10/2004 | Roush | |

FOREIGN PATENT DOCUMENTS

| | | | |
|---|---|---|---|
| EP | 1306755 A1 | 5/2003 | |
| EP | 1429569 A1 | 6/2004 | |
| WO | 0074412 A1 | 12/2000 | |

OTHER PUBLICATIONS

"Gentoo Linux Documentation—Portage Manual"; Apr. 27, 2002; http://web.archive.org/web/20021017090406/www.gentoo.org/doc/portage-manual.html; pp. 1-17.

* cited by examiner

*Primary Examiner* — Qing Chen
(74) *Attorney, Agent, or Firm* — Novak Druce Connolly Bove + Quigg LLP

(57) ABSTRACT

A method and apparatus for dynamically managing non-volatile memory items in a wireless device, the method comprising the steps of: checking the non-volatile memory items for a unique identifier item; if the unique identifier item exists, comparing an identifier stored within the unique identifier item with a software identifier located in software on the wireless device; and if the unique identifier item does not exist or if the identifier is different from the software identifier, performing the steps of: updating the non-volatile memory items; and writing the software identifier to the unique identifier item. The method may further include a rollback scheme for previous software versions.

12 Claims, 2 Drawing Sheets

SOFTWARE-DELIVERED DYNAMIC PERSISTENT DATA

RELATED APPLICATIONS

The present application is a continuation of U.S. patent application Ser. No. 10/765,512, entitled "Software Delivered Dynamic Persistent Data" filed Jan. 27, 2004 now U.S. Pat. No. 7,222,340. The full disclosure, including the drawings, of U.S. patent application Ser. No. 10/765,512 are incorporated herein by reference.

FIELD OF THE INVENTION

The present invention relates to dynamic management of persistent data in the non-volatile memory of a wireless device, and in particular deals with a method and apparatus for dynamically updating the non-volatile memory when a new software load is added in a manner which allows the rollback to previous software loads if necessary.

BACKGROUND TO THE INVENTION

Device specific, carrier specific and software-load specific persistent data is typically written to non-volatile memory at the time the device is built in the factory. If any error is introduced at this build time, or if a carrier's requirements change after the build time, or if new features are introduced in subsequent software loads which require updated persistent data, no mechanism exists to update these previously-released devices except for recalling them to a service outlet for reconfiguration.

Further, even if a means for writing updated data to a wireless device existed, a potential problem is introduced for backward compatibility. A typical situation in which backward compatibility is required would be if the user has received a software update for their wireless device and then subsequently has downgraded their software load to the previous release. In this case, the new persistent data which is presented with the updated software load may not be supported by the previous software load, causing potential software errors on the wireless device.

SUMMARY OF THE INVENTION

The present invention allows persistent data items in non-volatile memory that require changes following the release of a device to the field to be rewritten by software during the first time the device is initialized following the loading of the new software. The changes are made and implemented in such a manner that safe rollback semantics are achieved. In this way, if the user desires, loading an earlier software release will rollback the data to the previous state and thus negate the changes in the persistent data.

The present invention further supports the ability to change persistent data regardless of what release of the software is on the device. This may be implemented in situations where a bug is found to be caused by an incorrect value stored in the persistent data. In this case, regardless of the release, it is desirable to universally modify the persistent data.

The present invention further provides that changes to the persistent data can be implemented on a per-carrier basis. Alterations to persistent data can be implemented in a particular software load only for a particular carrier (or carriers). This allows carrier flexibility.

The present invention therefore provides a method of dynamically managing non-volatile memory items in a wireless device, said method comprising the steps of: checking the non-volatile memory items for a unique identifier item; if said unique identifier item exists, comparing an identifier stored within said unique identifier item with a software identifier located in software on said wireless device; and if said unique identifier item does not exist or if said identifier is different from said software identifier, performing the steps of: updating said non-volatile memory items; and writing said software identifier to said unique identifier item.

The present invention further provides a method for dynamically managing non-volatile memory items on a wireless device, said method allowing rollback to previous versions of software using said non-volatile memory items, said method comprising the steps of: checking the non-volatile memory items for a unique identifier item; if said unique identifier item exists, comparing an identifier stored within said unique identifier item with a software identifier located in software on said wireless device; and if said unique identifier item does not exist or if said identifier is different from said software identifier, performing the steps of: updating said non-volatile memory items, said updating step: creating a new non-volatile memory item rather than replacing an existing non-volatile memory item to facilitate rollback; retaining non-volatile memory items that have previously been created; and avoiding non-volatile memory items created by default or refurbished non-volatile memory files; and writing said software identifier to said unique identifier item, whereby said creating, retaining, and avoiding steps in said updating step allow rollback to previous versions of software on said wireless device.

BRIEF DESCRIPTION OF THE DRAWINGS

The present invention will be better understood with reference to the drawings, in which.

DETAILED DESCRIPTION OF THE INVENTION

Figure 1:
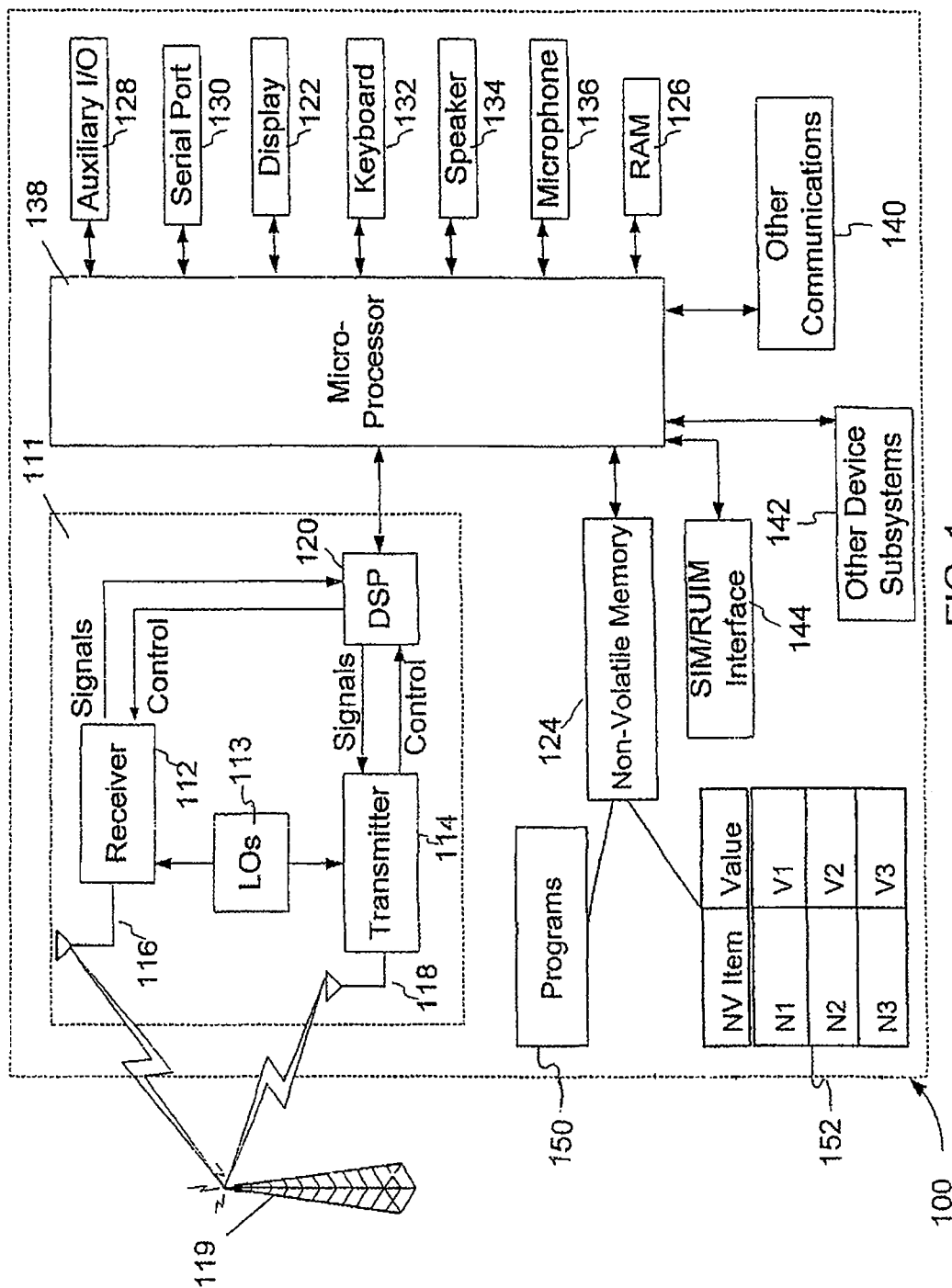
FIG. 1 is a schematic diagram of the apparatus of the present invention.

When loading a new software load on a device, several considerations must be taken into account regarding the manipulation of persistent data in the non-volatile (NV) file system. It is important that the overall inspection and modification of the NV file system must occur only once following a software upgrade. This ensures that the software can set values and/or add new items during this first time initialization but that any changes to the NV made outside the context of Dynamic NV management do not unexpectedly reset in subsequent time periods.

It is further important that during the one-time execution of the NV file system modification, any existing persistent data in the NV can be set to a given value and that new NV items (also referred to as NVs) can be added if necessary.

Referring to the drawings, mobile station 100 is preferably a two-way wireless communication device.

Where mobile station 100 is enabled for two-way communication, it will incorporate a communication subsystem 111, including both a receiver 112 and a transmitter 114, as well as associated components such as one or more, preferably embedded or internal, antenna elements 118, local oscillators (LOs) 113, and a processing module such as a digital signal processor (DSP) 120. As will be apparent to those skilled in the field of communications, the particular design of the communication subsystem 111 will be dependent upon the communication network in which the device is intended to operate.

A mobile station may require a removable user identity module (RUIM) or a subscriber identity module (SIM) card in order to operate on a CDMA network. The SIM/RUIM interface 144 is normally similar to a card-slot into which a SIM/RUIM card can be inserted and ejected like a diskette or PCMCIA card.

When required network registration or activation procedures have been completed, mobile station 100 may send and receive communication signals over the network 119. Signals received by antenna 116 through communication network 119 are input to receiver 112, which may perform such common receiver functions as signal amplification, frequency down conversion, filtering, channel selection and the like, and analog to digital (A/D) conversion.

Mobile station 100 preferably includes a microprocessor 138 which controls the overall operation of the device. Communication functions are performed through communication subsystem 111. Microprocessor 138 also interacts with further device subsystems such as the display 122, non-volatile memory 124, random access memory (RAM) 126, auxiliary input/output (I/O) subsystems 128, serial port 130, keyboard 132, speaker 134, microphone 136, a short-range communications subsystem 140 and any other device subsystems generally designated as 142.

Operating system software used by the microprocessor 138 is preferably stored in a persistent store such as non-volatile memory 124, which may instead be a read-only memory (ROM) or similar storage element (not shown). Those skilled in the art will appreciate that the operating system, specific device applications, or parts thereof, may be temporarily loaded into a volatile memory such as RAM 126. Received communication signals may also be stored in RAM 126.

As shown, non-volatile memory 124 can be segregated into different areas for both programs storage 150 and non-volatile memory items 152.

Microprocessor 138, in addition to its operating system functions, preferably enables execution of software applications on the mobile station. A predetermined set of applications that control basic operations will normally be installed on mobile station 100 during manufacturing. Further applications may also be loaded onto the mobile station 100 through the network 119, an auxiliary I/O subsystem 128, serial port 130, short-range communications subsystem 140 or any other suitable subsystem 142, and installed by a user in the RAM 126 or preferably non-volatile memory 124 for execution by the microprocessor 138. Such flexibility in application installation increases the functionality of the device and may provide enhanced on-device functions, communication-related functions, or both. However, when software is upgraded, often non-volatile memory items 152 need to be modified dynamically.

Figure 2:
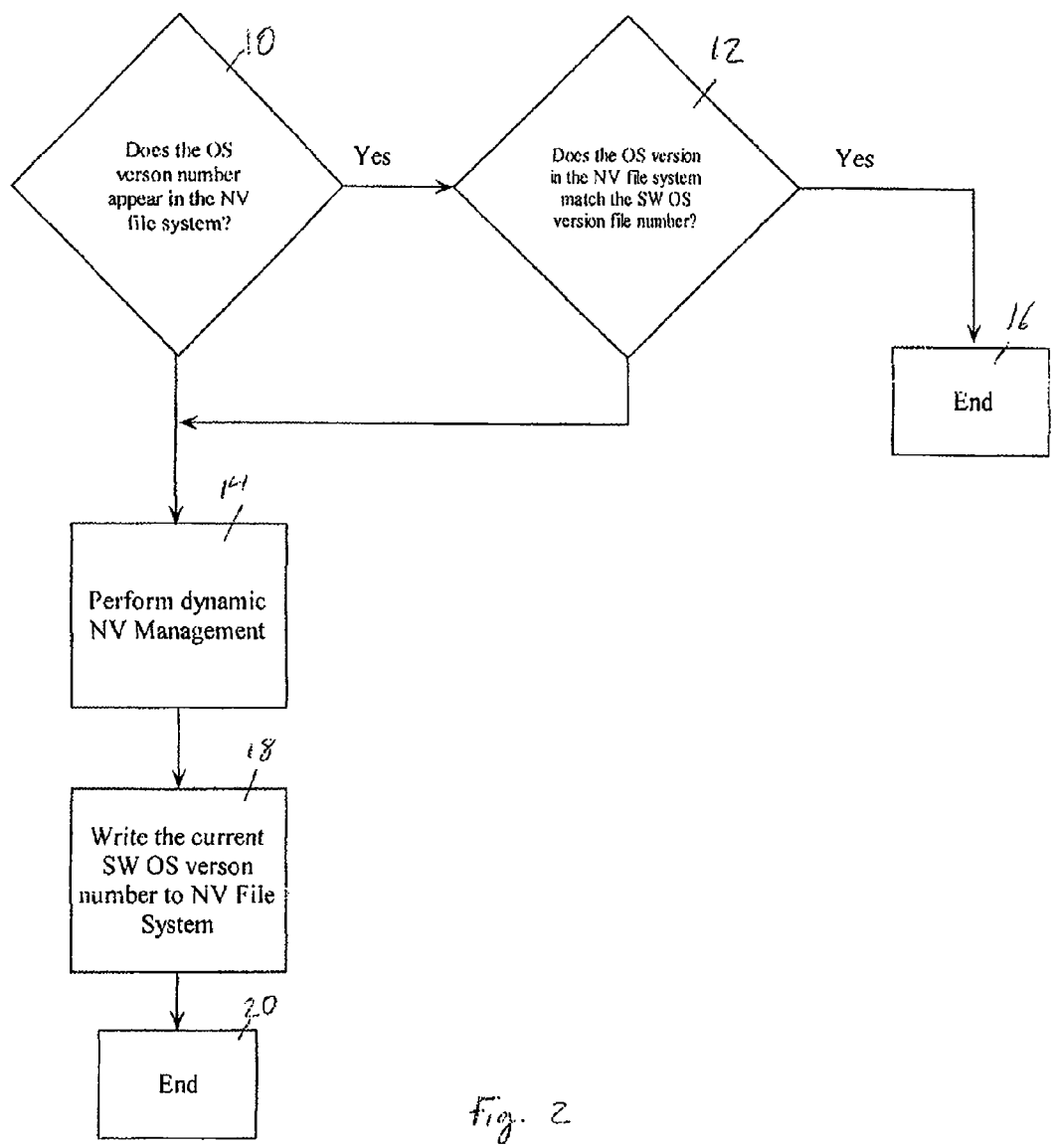
FIG. 2 is a flow diagram of the method of the present invention.

Reference is now made to FIG. 2. In order to implement an NV update, it is possible to write an operating system version number into the NV file system. Then when a software load change occurs, the software checks, at step 10, to see if the OS version number is written into the NV file system. If the OS version number does appear in the NV file system, the method of the present invention next moves to step 12, and the OS version number in the NV file system is compared with the current version number found in the software load.

If the OS version does not appear in the NV file system, or if it does not match the current version number found in the NV file system, the method of the present invention next moves to step 14 and performs any dynamic management required for the NV items and values. Otherwise, if the two OS version numbers correspond with each other the method moves to step 16 and ends.

From step 14 the method next moves to step 18. In step 18 the method writes the current OS version to the predetermined location in the NV file system and ends the process in step 20.

The above algorithm can therefore be summarized as:

Check if the OS version number appears in the NV file system.
   If the OS version number appears in the NV file system, compare it with the current software version number.
   If the OS version number does not appear in the NV file system, or if it does appear but does not match the current version number of the new software, then:
     Do any required dynamic management of the NV items and values.
     Write the current OS version number to the appropriate NV item.

As will be realized by one skilled in the art, other identifying data besides the OS version number could be used to track software updates. This could include any identifier placed within the software that changes between software loads.

By performing the above algorithm, subsequent resets without changing software loads will not result in further manipulation of the NV file system. This allows changes to NV values outside the context of dynamic NV management and ensure that those values will not be reset to previous values as a side effect of resetting the device.

The writing of the current OS version number into the NV file system is performed in step 18 at the end of the updating algorithm. This safeguards the NV file system to ensure that a complete update is performed. If a complete update is not performed, for example if the device has reset or otherwise died before the dynamic NV manipulation have been completed, the software will try to manipulate the NV file system the next time the device is turned on. This is because the same algorithm will run as described above and will find that the NV item related to the OS version number differs from the current OS version number found in the software. At the end of a successful manipulation of the NV file system, the OS version number is updated and prevents the algorithm from running again until a new software load is loaded.

For error handling purposes, the key is that the dynamic management of the NVs must be performed completely. Based on the algorithm above, dynamic management occurs when the OS version number found in the NV item either does not exist or exists but has the wrong number. The other scenarios in this case are if there is a failed attempt to write to an NV or a failed attempt to read. In these cases, error messages are written and the initialization is ended without writing the new OS version to the NV item. This ensures that on the next initialization, the software will again try to complete the dynamic management of the NV.

The above provides the additional benefit that it is easy to implement carrier-specific dynamic NV manipulations. An extension of the above algorithm is to query the System ID for the home network of the device and, based on the value found in this NV item, to manipulate other NV items based on the value found in the home system identification (SID) NV.

As used herein, traditional management of NV memory items indicates management through service recalls and configuration when the device is built. Dynamic management indicates management of NV items at the mobile device such as during the changing of software loads.

A further desired feature for NV file system management is the dynamic rollback of the NV to previous software versions. In the situation where a user loads a new software version and decides that they want to revert back to an old version, if the NV file system has been changed, the old version of the software may be relying on an NV item that has been modified and thus may not work correctly. To overcome this, a rollback scheme is proposed for the present invention.

In order to avoid difficulties in rolling back the NV, the following rules should be followed:

Rule 1: An NV should not be both under dynamic management and traditional management. For clarity, an NV item should be set/created in software as part of a dynamic NV management scheme or it should managed in some other manner but not both.

Rule 2: The addition of a new NV should be favoured over changing the value of an existing NV. This allows backward compatibility by not changing the values of the present NVs to newer values.

Rule 3: NVs cannot be deleted from the software once a load which creates that NV has been deployed.

If Rule 1 is not observed, a risk exists that dynamically managed NV settings would be overwritten at the device build time or at the factory or store device configuration time. If an NV is managed under dynamic management, it should be removed from management of any existing NV management scheme.

The above also applies on a per carrier basis. If a particular carrier needs an NV setting to change in value for the next load, then that NV should be considered to be under dynamic management for all carriers from that point forward. The NV should be defined and implemented with correct behaviours for those other carriers and software and that NV should be removed from any other NV management scheme.

Once an NV is handled in dynamic management, it can never go back to any other management scheme. This avoids problems with the loading of various software loads and the changing between the software loads.

Rule 2 exists to ensure that values for older loads do not get overwritten by newer loads in the case where a user may revert back to the older load. If the value is overwritten and an older load is reloaded, then a defect could occur in the software. Conversely, if a new NV is added for a new load, then the old load can still be loaded back onto the wireless device while maintaining its functionalities since the original NV has not been overwritten.

The above is better illustrated with an example. For simplicity's sake, the example below assumes that there are only two NV items initially defined as N1 and N2 with values V1 and V2. A first software load, defined as L1, illustrates the last load created that has no dynamic NV support. This load is illustrated in the table below.

TABLE 1

| L1 | |
|---|---|
| N1 | V1 |
| N2 | V2 |

In this load, N1 must have a value of V1. If it does not, a bug will surface in load 1.

A second load alters the configuration of load 1 by adding a new NV, defined below as N3, with a value of V3. N3 is added as a dynamic NV and is not managed in any other way pursuant to Rule 1. When the device is upgraded from L1 to L2, the NV file system transition is as follows:

TABLE 2

| L1 | | L2 | |
|---|---|---|---|
| N1 | V1 | N1 | V1 |
| N2 | V2 | N2 | V2 |
| N3 | V3 | N3 | V3 |

From the table above, it can be seen that a downgrade to the first load L1 is fine since the first and second NV items N1 and N2 have the values that load 1 expects for them.

In a third load, the value for N1 needs to be changed to some new value V4. Rule 2 indicates that we should not change the value of L1, but rather to add a new NV with the desired value and use the new NV instead of the old one. In this case, L3 adds a new NV item N4 with the value V4. N4 is thus under dynamic management and not managed in any other way pursuant to Rule 1. The upgrade from L2 to L3 looks like this:

TABLE 3

| L2 | | L3 | |
|---|---|---|---|
| N1 | V1 | N1 | V1 |
| N2 | V2 | N2 | V2 |
| N3 | V3 | N3 | V3 |
| N4 | N/A | N4 | V4 |

Despite the fact that the third load has no need for N1 anymore, N1 is not removed from the NV file system pursuant to Rule 3. From L3, either load 1 or load 2 could be reloaded onto the device and would still work because the previous versions of the NV file system still exist below the changes made for L3. A downgrade to L1 is possible because N1 and N2 have the correct values for load 1. While N3 and N4 appear in the NV file system, they will not be accessed by load 1. Also, a downgrade from load 3 to load 2 is possible since all of the values of N1, N2 and N3 are correct in load 2.

If a user has not implemented load 2 but moves to load 3 directly from load 1, the upgrade will add values for N3 and N4 and will look like the following table:

TABLE 4

| L1 | | L3 | |
|---|---|---|---|
| N1 | V1 | N1 | V1 |
| N2 | V2 | N2 | V2 |
| N3 | N/A | N3 | V3 |
| N4 | N/A | N4 | V4 |

A further addition to ensure compatibility for dynamic management tools is to create a mapping for all NV requests not originating within the device software. This mapping takes the intent of Rule 2, namely the new NV items are intended to completely replace old NV items. Once replaced, it is the intent that all uses of the old NV be replaced by uses of the new NV. In keeping with that intent, the dynamic management tools can ask for items by number.

When a new software load is added, the map may be changed in the software load to ensure that all of the values used by the load are mapped to the correct NV item.

Software that requests an NV item by number or logical index first goes through the mapping to determine whether it should be getting the value from a new NV item and, if so, gets the value of this new NV item. This mapping ensures that compatibility is maintained between the wireless device third party tools that know about the existence of certain NV items and ask for them by logical index.

The above therefore defines a method for updating the persistent data in the non-volatile memory dynamically, and further discusses an implementation which allows the rollback to previous software loads if desired by the user.

Although the present invention has been described with regard to the preferred embodiments thereof, one skilled in the art will realize that other variations are possible, and that the invention is only intended to be limited in scope by the following claims.

I claim:

1. A method to provide for rollback to a previous software load on a mobile device, the method comprising the steps of:
    creating, by a processor of the mobile device, non-volatile memory items for a software load;
    preventing, by the processor of the mobile device, deletion of any non-volatile memory items once the non-volatile memory items are created;
    adding, by the processor of the mobile device, when upgrading to a new software load, a new non-volatile memory item rather than replacing a value in an existing non-volatile memory item when the new non-volatile memory item corresponds to the existing non-volatile memory item; and
    mapping, by the processor of the mobile device, the existing non-volatile memory item to the new non-volatile memory item so that requests for a non-volatile memory item are mapped to a correct non-volatile memory item;
    wherein the adding step and the preventing step allow utilization of non-volatile memory items and non-volatile memory item values from the previous software load when rolling back to the previous software load.

2. The method of claim 1, further comprising the step of avoiding non-volatile memory items created by default or refurbished non-volatile memory files.

3. The method of claim 2, further comprising the step of creating a new non-volatile memory item to replace the non-volatile memory items created by default or part of the refurbished non-volatile memory files.

4. The method of claim 3, further comprising the step of barring use of the non-volatile memory items created by default or the refurbished non-volatile memory files.

5. The method of claim 1, wherein the mapping step is based on a map that is changed in the new software load.

6. The method of claim 5, wherein the requests for a non-volatile memory item are mapped from a non-volatile memory item number or a non-volatile memory item index to a correct non-volatile memory item number.

7. A wireless communications device comprising:
    a receiver configured to receive signals;
    a transmitter configured to transmit signals;
    a digital signal processor configured to process signals to be transmitted on the transmitter and received on the receiver;
    a processor configured to communicate with the digital signal processor;
    a non-volatile memory having program storages and non-volatile memory items, wherein the non-volatile memory is configured to communicate with the processor; and
input and output subsystems configured to interact with the processor, wherein the processor includes:
    means for creating non-volatile memory items for a software load;
    means for preventing deletion of any non-volatile memory items once the non-volatile memory items are created;
    means for adding, when upgrading to a new software load, a new non-volatile memory item rather than replacing a value in an existing non-volatile memory item when the new non-volatile memory item corresponds to the existing non-volatile memory item; and
    a map adapted to map the existing non-volatile memory item to the new volatile non-volatile memory item so that requests for a non-volatile memory item are mapped to a correct non-volatile memory item;
    wherein the means for adding and the means for preventing are configured to allow utilization of non-volatile memory items and non-volatile memory item values from a previous software load when rolling back to the previous software load.

8. The wireless communications device of claim 7, further comprising means for avoiding non-volatile memory items created by default or refurbished non-volatile memory files.

9. The wireless communications device of claim 8, further comprising means for creating a new non-volatile memory item to replace the non-volatile memory items created by default or part of the refurbished non-volatile memory files.

10. The wireless communications device of claim 9, further comprising means for barring use of the non-volatile memory items created by default or the refurbished non-volatile memory files.

11. The wireless communications device of claim 7, wherein the map is changed in the new software load.

12. The wireless communications device of claim 11, wherein the map is further adapted to map the requests for a non-volatile memory item from a non-volatile memory item number or a non-volatile memory item index to a correct non-volatile memory item number.

* * * * *